United States Patent Office 2,706,968
Patented Apr. 26, 1955

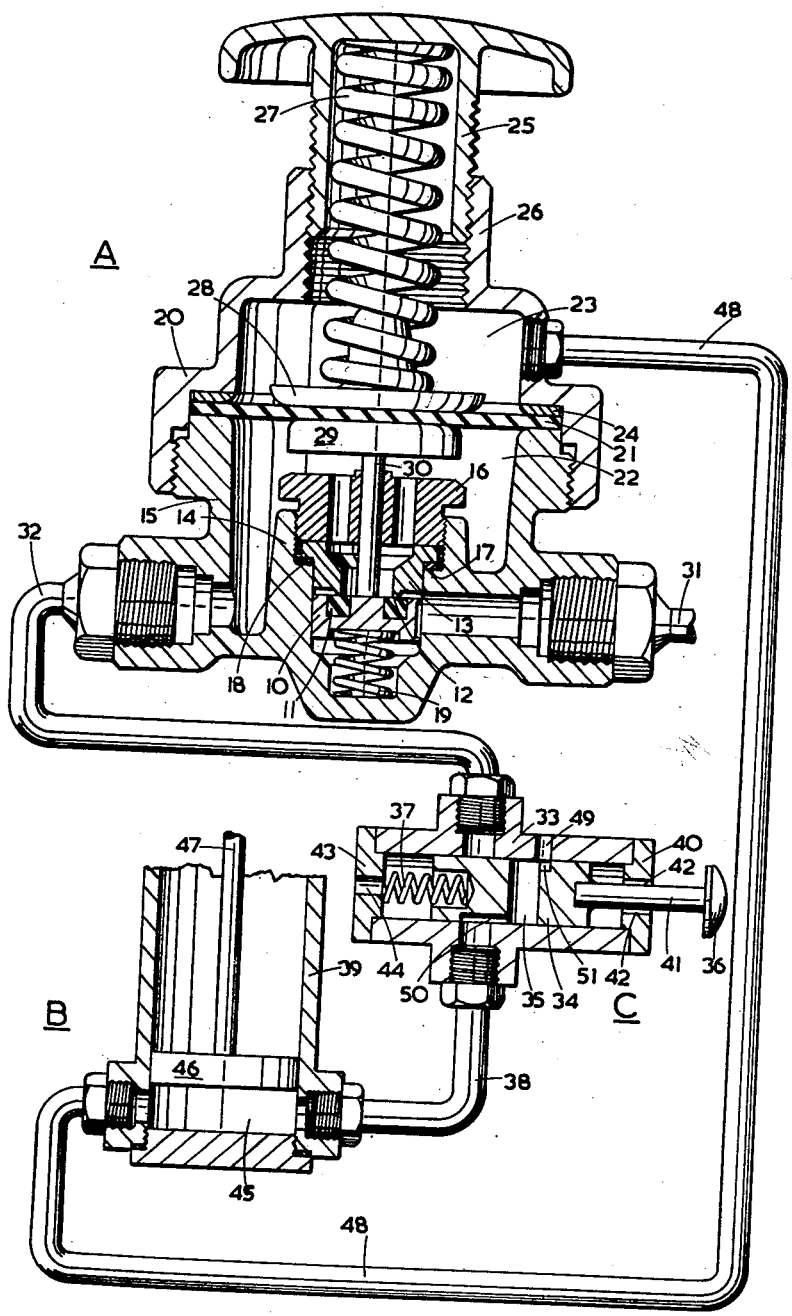

2,706,968
SPEED CONTROL MEANS FOR A FLUID-ACTUATED MOTOR

Cosby Donald Philipps Smallpeice, Swanwick Shore, near Southampton, England

Application January 27, 1954, Serial No. 406,457

4 Claims. (Cl. 121—38)

This invention relates to a speed control means for a fluid-actuated motor, particularly for automatically regulating to a substantially constant value the speed of operation when the motor is subjected to different conditions of loading.

The speed of operation of a fluid-actuated motor depends upon the pressure of the fluid supplied to it, the size of a supply orifice (e. g., of a control valve) in the path to the motor, and the back-pressure in the motor due to the load being operated on. It therefore follows that the speed of operation will normally be very much higher when the motor is unloaded, or only lightly loaded, than when the load is a substantial one; and if the associated control valve has an orifice which is sufficiently large for the motor to be operated under maximum load conditions, the motor when unloaded will operate at a speed which is often undesirably high or even dangerous. This is particularly the case when the motor is a piston and cylinder arrangement operating with compressed air and actuating a hoist.

The object of the invention is a means whereby the speed of the motor can be automatically regulated to a substantially constant value regardless of its condition of loading.

The means according to the invention includes a pressure-regulator in a line which supplies the working fluid to the motor, and means for automatically adjusting the pressure regulator in dependence on the back-pressure due to the condition of loading of the motor, whereby the regulated pressure of the fluid delivered to the motor intake is increased as the load on the motor increases, and vice versa, for maintaining the speed of operation at a substantially constant value under different conditions of loading.

Preferably the pressure-regulator is of the kind having a pressure-responsive element which is also subject to a manual control for adjusting the regulated pressure of the fluid it delivers, whereby the said regulated pressure depends on both the manual adjustment and the motor back-pressure. This pressure-responsive element can be a movable element which sealingly separates the outlet chamber of the pressure-regulator from a second chamber in the latter to which the back-pressure is fed and which acts on a movable regulating element.

The accompanying drawing illustrates an application of the means of the invention for regulating, to a substantially constant value, the speed of operation of a pneumatic piston and cylinder arrangement forming the motor of a hoist.

In the drawing the pressure regulator is indicated generally at A, the piston and cylinder arrangement at B, and a manually-actuated control valve, for said arrangement, at C.

The movable element of the pressure-regulator is indicated at 10, and it carries a sealing ring 11 for coaction with an annular seating lip 12 of a ring 13. The latter is held in an internal, cup-like boss 14 of the regulator body portion 15 by a guide 16 having a screw-threaded engagement in the boss, the guide clamping a flange of the ring up to an internal shoulder 17 of the boss with an interposed sealing washer 18. A spring 19 biases the ring 11 towards the lip 12.

A second portion, 20, of the regulator body has a screw-threaded engagement with the portion 15, and both have facing annular surfaces between which is clamped a diaphragm 21 dividing the interior into two chambers 22 and 23. As shown, there is a washer 24 trapped between the part 20 and the diaphragm.

A manually-adjustable, hollow, regulating head 25 has a screw-threaded engagement in a bore of a boss 26 of the part 20, thus sealing the chamber 23, and the head engages over one end of a regulating spring 27 whose other end engages a circular rigid pad 28 bearing on the diaphragm. The latter, in turn, bears on a second rigid pad 29 which is fast with a stem 30, extending through the guide 16, of the movable element 10.

Compressed air is fed from a mains supply pipe 31 to the interior of the cup-like boss 14 in a position beneath the movable element 10, and when the regulating head 25 is appropriately turned for causing the spring 27 to apply a sufficient bias, through the diaphragm, to unseat the movable element 10 from the lip 12, the mains pressure is admitted into the chamber 22. As the pressure in the chamber 22 builds up, it acts on the adjacent side of the diaphragm 21 in opposition to the bias of the spring 27 in order to maintain the position of the element 10, relatively to the seating lip 12 for air at a desired pressure to leave the chamber 22 through an outlet pipe 32.

The pipe 32 communicates with the body 33 of the control valve C, the latter having an internal bore in which works a piston 34, with a transverse duct 35. The piston can be urged by a knob 36 against a biasing spring 37 for establishing a communication, through the duct 35, between the pipe 32 and a further pipe 38 leading to the cylinder 39 of the arrangement B. It will be seen that the valve body 33 has an end plate 40 in a bore in which is guided a rod 41 of the piston 34, there being marginal grooves 42, 42 round the bore for preventing pressure changes at the adjacent end of the cylinder when the piston is moved in the latter. At its other end the valve body is similarly provided with an end plate 43 having a central hole 44 for the like purpose.

The piston and cylinder arrangement B shown is a single-acting one, and the pipe 38 delivers to the working space 45 for moving the piston 46 upwardly in the figure and for its rod 47 to apply an effort to a load (not shown). The working space 45 also communicates, through a pipe 48, with the chamber 23 above the diaphragm 21 of the pressure-regulator A.

In operation the regulating head 25 is adjusted for opening the valve 11, 12 to a desired extent whereby to provide a desired pressure drop between the pipes 31 and 32 when the control valve C has been operated to its open position. With the piston rod 47 unloaded, the pressure in the working space 45 is set by the pressure-regulator A to operate the piston 46 at a desirably low speed. Then, when the piston rod 47 has to operate upon a load, the back-pressure in the space 45 will build up and be transmitted through the pipe 48 to the chamber 23, causing the diaphragm to tend to depress the movable element 10 for more widely opening the valve 11, 12. This reduces the pressure drop between the pipes 31 and 32 so that a higher pressure is fed through the latter pipe and the control valve C to the working space 45 for overcoming the load, and the piston 46 will move at approximately the same speed as when unloaded.

For effecting the return stroke of the piston 46, the control valve knob 36 is released and this causes the spring 37 to move the piston for putting the pipe 38 into communication with an exhaust port 49. For enabling the duct 35 to put the pipe 38 into communication with either the pipe 32 or the exhaust port 49, it is shown provided with lateral extensions 50 and 51; although, obviously, any other suitable control valve could be used.

While the application of the invention to a pneumatic piston and cylinder motor of a hoist has been described, it will be apparent that the invention is equally applicable for regulating the loaded and unloaded speeds of such motors, whether single-acting or double-acting, when for other purposes; also that it has equal application to other types of motor whether the latter be pneumatically or hydraulically actuated.

What I claim as my invention and desire to secure by Letters Patent of the United States is:

1. Means for automatically regulating to a substantially constant value the speed of operation of a fluid-actuated motor when the latter is subjected to different conditions of loading, including a pressure-regulator in a line which supplies the working fluid to the motor, said pressure-regulator including two internal chambers separated by a movable pressure-responsive element, fluid inlet and outlet connections to one of said chambers, a valve between said inlet and outlet connections, said valve biased towards its closed position, means interconnecting said valve and said pressure-responsive element, means acting on said pressure-responsive element and through said interconnecting means to bias said valve towards its open position, and means communicating to the other said chamber the back-pressure due to the condition of loading of the motor whereby said back-pressure acts on said pressure-responsive element to more widely open said valve as the load on the motor increases, and vice versa.

2. Means, according to claim 1, in which the means acting on said pressure-responsive element includes a compression spring of which one end abuts said element, and manually adjustable means abutting the other end of said spring, said spring acting either alone or in concert with the motor back-pressure, depending on the value of the latter, to bias the valve towards the open position.

3. A fluid-actuated motor system including a motor, a line which supplies working fluid to the motor and means for automatically regulating to a substantially constant value the speed of operation of the fluid-actuated motor when the motor is subjected to different conditions of loading, said means including a pressure-regulator in said line, said pressure-regulator including two internal chambers separated by a movable pressure-responsive element, fluid inlet and outlet connections to one of said chambers, a valve between said inlet and outlet connections, said valve biased towards its closed position, means interconnecting said valve and said pressure-responsive element, means acting on said pressure-responsive element and through said interconnecting means to bias said valve towards its open position, and means communicating to the other said chamber the back-pressure due to the condition of loading of the motor whereby said back-pressure acts on said pressure-responsive element to more widely open said valve as the load on the motor increases, and vice versa.

4. A fluid-actuated motor system, according to claim 3, in which the means acting on said pressure-responsive element includes a compression spring of which one end abuts said element, and manually adjustable means abutting the other end of said spring, said spring acting either alone or in concert with the motor back-pressure, depending on the value of the latter, to bias the valve towards the open position.

References Cited in the file of this patent

UNITED STATES PATENTS

| | | |
|---|---|---|
| 501,959 | Rawlings | July 25, 1893 |
| 549,978 | True | Nov. 19, 1895 |
| 1,533,304 | Bruce | Apr. 14, 1925 |